(12) United States Patent
Pepper et al.

(10) Patent No.: US 7,155,450 B2
(45) Date of Patent: Dec. 26, 2006

(54) PLANT INFORMATION MANAGEMENT SYSTEM

(75) Inventors: Ian Anthony Pepper, Dublin (IE); Austin Cagney, Dublin (IE); Anthony Prylowski, Dublin (IE)

(73) Assignee: Automsoft R & D Limited, Dublin (IE)

( * ) Notice: Subject to any disclaimer, the term of this patent is extended or adjusted under 35 U.S.C. 154(b) by 92 days.

(21) Appl. No.: 10/141,337

(22) Filed: May 9, 2002

(65) Prior Publication Data

US 2002/0188366 A1 Dec. 12, 2002

(30) Foreign Application Priority Data

May 10, 2001 (IE) .................................. 2001/0450

(51) Int. Cl.
*G06F 17/30* (2006.01)
(52) U.S. Cl. .................. 707/102; 707/101; 700/108
(58) Field of Classification Search ............. 707/1–3, 707/104.1, 100–102
See application file for complete search history.

(56) References Cited

U.S. PATENT DOCUMENTS

| | | | | |
|---|---|---|---|---|
| 4,975,865 A | * | 12/1990 | Carrette et al. ............... 700/10 |
| 5,301,319 A | | 4/1994 | Thurman et al. ............ 395/600 |
| 5,463,555 A | | 10/1995 | Ward et al. .................. 364/468 |
| 5,689,415 A | * | 11/1997 | Calotychos et al. .......... 700/67 |
| 6,023,703 A | * | 2/2000 | Hill ............................ 707/100 |
| 6,223,342 B1 | | 4/2001 | George ......................... 717/10 |
| 6,850,861 B1 | * | 2/2005 | Faiola et al. ................. 702/130 |
| 2002/0091675 A1 | * | 7/2002 | Shimokawa et al. ........... 707/1 |
| 2002/0156542 A1 | * | 10/2002 | Nandi |
| 2002/0173911 A1 | * | 11/2002 | Brunet et al. ................... 702/1 |
| 2003/0144746 A1 | * | 7/2003 | Hsiung et al. |
| 2003/0158795 A1 | * | 8/2003 | Markham et al. |

FOREIGN PATENT DOCUMENTS

WO WO00/10109 2/2000

OTHER PUBLICATIONS

MasterCell Ultimate Event Management, IT Masters White Paper, Jul. 1998, pp. 1-22.
Ravat et al, Proc of 8$^{TH}$ Intnl Conf on Info Knowledge Mangmnt, Towards Data Warehouse Design, Nov. 2, 1999, pp. 359-366.
Sussenguth, Jr., Communications of the ACM, vol. 6, No. 5, pp. 272-279, May 1963, Use of Tree Structures for Processing Files.
Aspentech Analysis of Information Management, of Real-Time Process Manufacturing Data, web site Feb. 16, 2001.

* cited by examiner

*Primary Examiner*—Debbie M. Le
(74) *Attorney, Agent, or Firm*—Jacobson Holman PLLC

(57) ABSTRACT

In a plant information management system (PIMS, 1), data received from a process device (PCC, 10) is cached by a data logger (2) in blocks. A database controller (4) receives, for each data event, a time string, a value string, and a data quality indicator. The quality indicator is stored by exception only (if "bad"). MSBs of the time string are encoded in a hierarchical database structure of item (process device)—year—day levels. LSBs of the time string, the value string, and quality exceptions are stored as event objects in linked list arrays referenced to a day array object. There is thus no need for an index and the structure provides hierarchical compression.

13 Claims, 2 Drawing Sheets

PLANT INFORMATION MANAGEMENT SYSTEM

FIELD OF THE INVENTION

The invention relates to a plant information management system (PIMS) for industries such as the food, beverage, pharmaceutical, and utility industries.

PRIOR ART DISCUSSION

One of the major technical problems for many PIMS is that of how to handle the vast quantity of raw data captured from plant equipment such as a pressure sensor. For example, in a typical pharmaceutical plant there may be tens or even hundreds of thousands of items such as temperature and pressure sensors and valves, for each of which there may be a value change every second. Also, for each item a high level of accuracy is required for data. Such systems, typically run 24×7 collecting data from the plant equipment all the time.

Thus, in general, many PIMS are required to handle very high data rates from plant equipment, to store Terabytes of data, and to allow efficient and user-friendly access to the data for reporting. For example, a FDA regulated pharmaceutical plant may be required to store seven years of plant data online.

A second major problem is the nature (or shape) of the data itself. Each value change consists of a time stamp, the actual value and a quality indicator. Because, the data is used to spot trends in the product process it is queried by time only i.e. the time stamp in SQL parlance is the primary key.

Heretofore, one approach has been to use relational database (RDBMS) technology. This technology is widespread in general, and there is a large skillbase to support it. However it has difficulty handling very large volumes of data in the Terabyte range.

These performance problems are compounded by attempting to use the time stamp as an index (primary key). In this case, a time-based query becomes effectively a table scan. There is therefore a lack of scalability as the data set size increases.

These problems have led to use of a hybrid approach in some systems in which both flat structured files and RDBMS files are used. The process data is stored in flat files with typically one flat file per time period such as a day or week. Metadata is stored in the RDBMS. This is an improvement over the pure RDBMS approach; however, there is still a requirement to reduce data volumes by discarding using statistical techniques, and rounding of time stamps to second or even minute resolution all to reduce disk space and hence improve search times at the cost of data accuracy. Another problem is poor performance due to overhead imposed by the RDBMS layer.

The invention is therefore directed providing a plant information management system to address these problems.

SUMMARY OF THE INVENTION

According to the invention, there is provided a data capture system for a plant information management system, the data capture system comprising:
  a data logger comprising means for interfacing with a process device to receive process data in real time,
  a database controller comprising means for storing said data, characterised in that,
  the database controller comprises means for storing the data in a time-encoded hierarchical object structure with successive hierarchical levels associated with shorter time periods.

In one embodiment, the database controller comprises means for storing data for each measuring point as an event object in lowermost levels of the hierarchical structure.

In another embodiment, the database controller comprises means for storing the data in linked list arrays.

In a further embodiment, the database controller comprises means for storing item objects at an upper hierarchical level, each said item object being associated with a particular process device.

In one embodiment, the database controller comprises means for storing a year array object linked to each item object, said year object comprising an array of references to day array objects.

In another embodiment, the database controller comprises means for storing an event bucket linked with each day array object, said event bucket comprising linked list arrays of data event objects.

In a further embodiment, the data logger comprises means for determining quality of a data event, and for associating a quality indicator with the data event.

In one embodiment, the database controller comprises means for storing the quality indicator only if it is exceptional.

In another embodiment, the database controller comprises means for storing an event object as time and value strings in one array 23(b) and exceptional quality indicators in a linked array 23(c).

In a further embodiment, the database controller comprises means for defining the database structure according to a breakdown of bits of a time value for a data event, with most significant bits being associated with higher hierarchical levels.

In one embodiment, the database controller comprises means for storing only least significant bits of the time value in the data event, the most significant bits being encoded in the database hierarchical structure.

In another embodiment, the data logger comprises means for caching received event data.

In a further embodiment, the data logger comprises means for caching the event data intact in blocks which are linked list structures.

In one embodiment, the data logger comprises means for allocating a fresh linked list initially and for subsequently transferring flushed blocks to the fresh linked list to avoid the need to destroy flushed blocks and create fresh blocks after a data flush operation.

In a further embodiment, the data logger comprises means for inserting a time stamp in each block of the fresh linked list and for periodically destroying blocks which have been unused for a time period exceeding a threshold.

In another aspect, the invention provides a plant information management system comprising a data capture system as defined above.

DETAILED DESCRIPTION OF THE INVENTION

BRIEF DESCRIPTION OF THE DRAWINGS

The invention will be more clearly understood from the following description of some embodiments thereof, given by way of example only with reference to the accompanying drawings in which.

DESCRIPTION OF THE EMBODIMENTS

Figure 1:
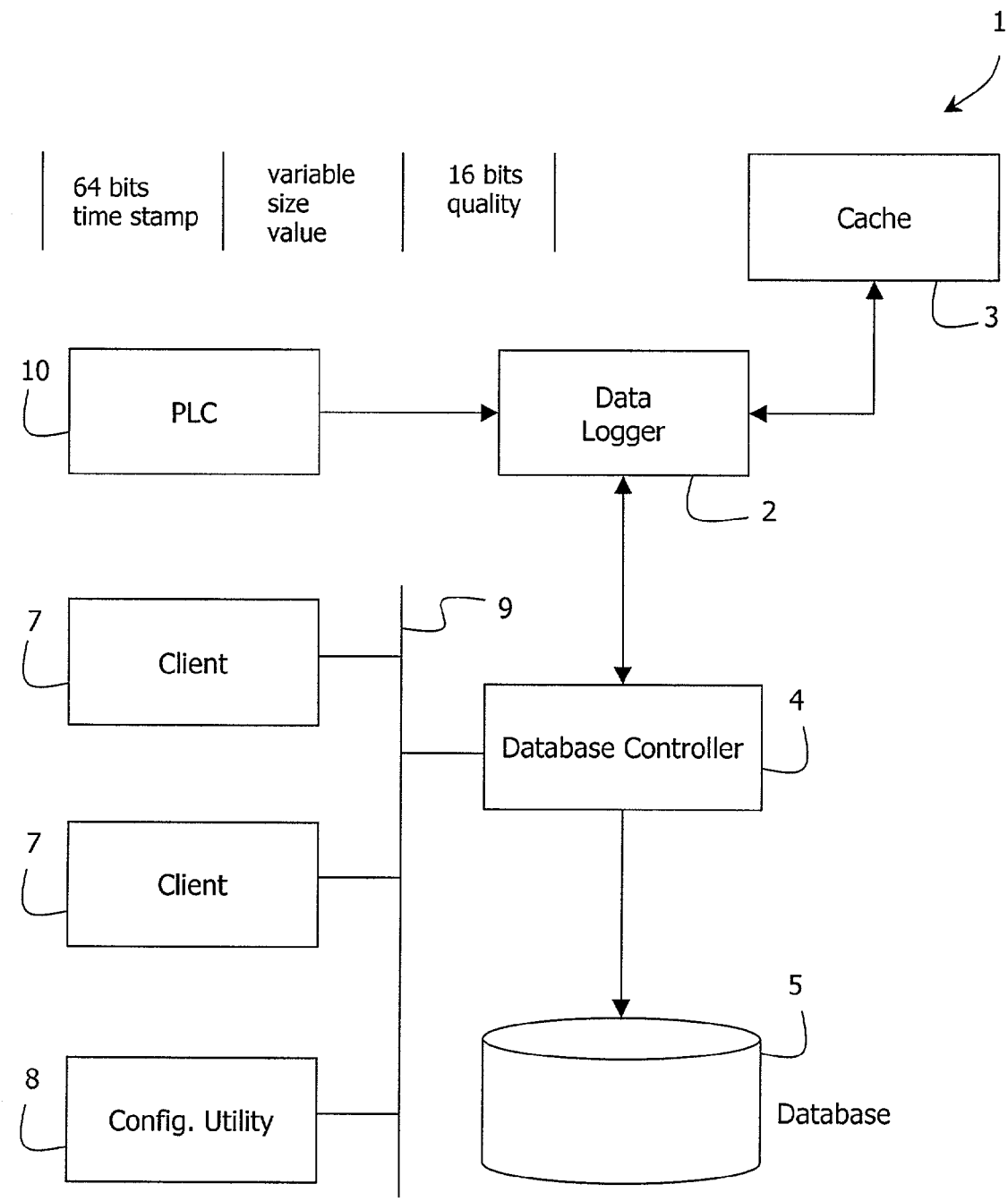
FIG. 1 is a schematic representation of a PIMS of the invention connected to a PLC.

Referring to the drawings, there is shown a plant information management system 1 connected for capture of process control data from a PLC 10. The system 1 comprises a data logger 2 connected to a memory cache 3. The data logger 2 is also connected to a database controller 4, in turn connected to an object database 5.

The raw events which are received by the data logger 2 are not received at a uniform rate, as this depends on the nature of the process activity. The process activity may, for example, be brewing or electricity generation. To deal with this non-uniformity, the data logger 2 uses the cache 3 as a buffer. It stores raw events in objects, each object stored in linked lists of blocks, each block being an array of up to 500 raw events.

The system 1 also comprises clients 7, and a configuration utility 8 interconnected on a LAN 9. The clients render the query data to the end user (trends). The configuration utility 8 is used to configure the parameters of the system (e.g. which PLCs to connect to). The LAN is used to connect the software components together for communication purposes.

The controller 4 stores the data in the object database 5 in which:

there is one "item" object per data source (e.g. pressure sensor), and multiple event objects associated with each item object;
the event objects are stored as linked lists of arrays;
each event object has time, value, and quality data fields;
the quality field is stored by exception only; and
part of the time stamp is encoded in the database structure, which is hierarchical according to time periods.

Figure 2:
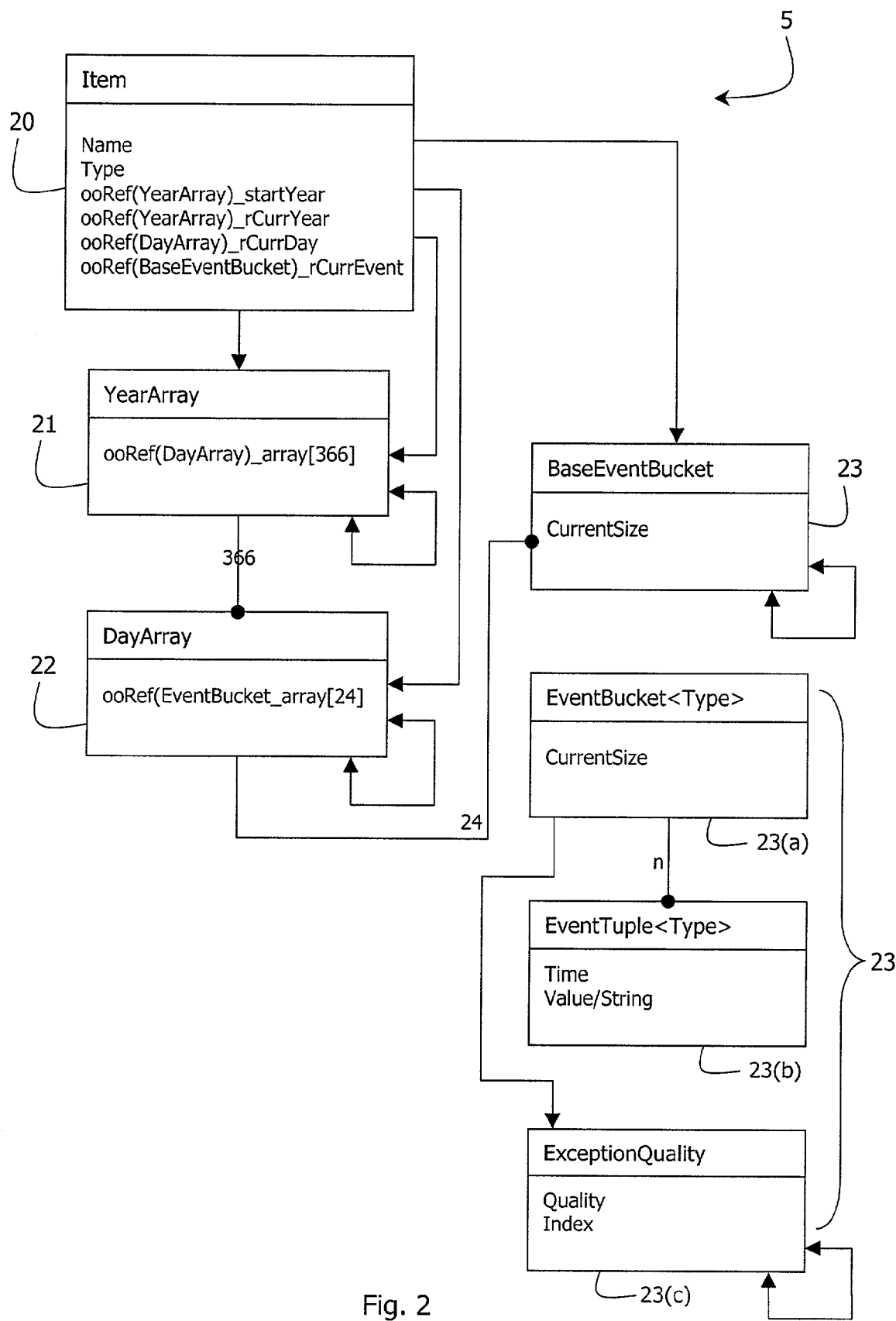
FIG. 2 is a diagrammatic representation of the database structure.

Referring to FIG. 2, the database 5 is illustrated. The upper level has item objects 20, each linked to a year array level 21 of YearArray objects to a level 22 of DayArray objects, and to a BaseEventBucket array level 23. Each YearArray object is linked with 365 DayArray objects in the level 22. Each DayArray object is linked with 24 EventBuckets in the level 23. The structure of the EventBucket level 23 is also shown in FIG. 2. It comprises an EventBucket, EventTuple, and ExceptionQuality arrays. One event object comprises the time and value fields of the EventTuple array, and an exception quality value in the ExceptionQuality array.

This database structure saves approximately six bytes of storage per event compared to previous approaches. It allows very fast searching, with access to an hour of interest in a limited and fixed number of steps. This is because the database structure itself is the index and there is no need for RDBMS indexes. This latter feature effectively provides hierarchical compression. It has been found that the database 5 allows writing of greater than 300,000 events per second and reading of greater than 1 million events per second.

In more detail, each raw event comprises a 64-bit time stamp, a variable length event value, and a 16-bit quality value. The data logger 2 uses the maximum available physical memory for the cache, and within the allocated memory it creates empty lists at the start of data capture. Each block of each list includes a time stamp indicating when it was created and the time stamp is subsequently updated during data capture to indicate when the block was last used. As blocks become full of raw events, the data is flushed out to the database 5 via the controller 4. The data logger avoids the (time-consuming) requirement for destroying and creating blocks at flush operations by instead simply adding flushed blocks to a free list. Periodically, the data is flushed and the block is added to the free list.

The data logger 2 also operates to minimise the amount of allocated cache memory at any point in time. The purpose of this feature is to ensure that there is sufficient available memory to cope at times when there is an inordinately high volume of raw events outputted by the PLC. An example of such a situation is occurrence of a fire at some of the process control equipment. Minimisation of allocated cache memory is achieved by periodically reading the block time stamps of the free linked list. All of the blocks which are older than a pre-set time period are automatically deleted. In this way, the linked lists have a good deal of capacity to accept new blocks.

As the raw events are flushed through the controller 4, events which have a value of bad (anything other than 0xC0) in the quality field are flagged. The purpose of this is to store the exception data in the database 5 as described below, but not to store any quality value if the quality is good. On the basis that most raw events have good quality indicators in the quality field, their approach minimises the amount of data stored.

This database structure is particularly effective. The item object stores references to the lower level objects and so fetches to retrieve the last objects captured are simple and quick. The fact that the least significant 32 time bits are stored at the event level optimise storage overhead and reduces fetch cycle time. These lower 32 bits represent a 71.5 minute window for each bucket 23, used to represent (rounded) to one hour.

Querying data is a very efficient operation. All queries are time based. Since most queries will be based on recent data, the starting point of the query is the current year array. Using the starting date for the query, the database abstraction layer 4 drills down through the schema to search for the requested event. Once that has been accomplished, the client can retrieve all subsequent events, one at a time, until it has retrieved all the desired events.

The item class describes the items that are defined for nodes. Data for items on OPC servers use the VARIANT data type, and data for items on DDE servers are converted to the type defined at item level. An item's data type enumeration directly matches the VARIANT data types, but are stored using specified data types. Array's of events, i.e. VARIANTs of type VT_ARRAY, are stored as separate events with the same timestamp.

Items can also receive alarm event (variable sized) structures. Items have non-specific placeholders for storing additional data without requiring schema updates. This is implemented as a reference to a linked list of attribute objects. The Item class also contains references to the last YearArray, DayArray, EventBucket, AlarmEventBucket and Annotation objects. These references allow for efficient location of objects that need updating when inserting data into the database.

The following are examples of data types.

TABLE 1

Native data types and VARIANT data types

| Native Data Type | VARIANT Data Type |
| --- | --- |
| ooVString | VT_BSTR |
| int8 | VT_I1 |
| uint8 | VT_BOOL, VT_UI1 |
| int16 | VT_INT, VT_I2 |
| uint16 | VT_UINT, VT_UI2 |
| int32 | VT_I4 |
| uint32 | VT_UI4 |

TABLE 1-continued

Native data types and VARIANT data types

| Native Data Type | VARIANT Data Type |
|---|---|
| float32 | VT_R4 |
| int64 | VT_I8, VT_CY |
| uint64 | VT_UI8 |
| float64/double | VT_R8 |
| Decimal | VT_DECIMAL (14 bytes) |

YearArray 21

The YearArray class is used to access all the event objects that have been recorded for an item over a period of a year, via an array of 366 references to DayArray objects. The Item class 20 contains a reference its first YearArray. The YearArray class contains bi-directional references to the next and previous YearArrays. A reference to the first YearArray is stored in the item object, to allow one to iterate through all the YearArray objects for an item.

Relationships
  Next/Prev
    Next/Prev are bi-directional one-to-one references, to YearArray objects, for iterating through all the YearArrays for an item.
  DayArray
    DayArray is an array of 366 references to DayArray objects for each day for an item.

Attributes
  Year
    The year attribute specifies which year the YearArray represents.

DayArray 22

The DayArray class is used to access all the event objects that have been recorded for an item over a period of a day, via an array of 24 references to the first EventBucket derived objects that are created at the start of each hour in a day. Bi-directional references to the next and previous DayArrays are used to allow one to iterate through all the DayArray objects for an item. The DayArray class also contains references to the first Annotation and AlarmEventBucket objects for each day. These objects could be referenced via the array of references to EventBucket derived objects, but this would mean that for each item different types of EventBucket derived objects could exist together and therefore the objects would have to be checked to see what type they are each time they are referenced. It is expected that alarm events and annotations occur infrequently.

EventBucket

The EventBucket is a base class, which in its derived form contains an embedded array of event objects. The class contains bidirectional references to the next and previous EventBuckets, to allow for efficient iteration through all events for an item. The class also contains a reference to a linked list of ExceptionQuality objects and a DWORD for holding the upper 32 bits of the event time's FILETIME structure, which reduces the storage required for each event. The size of each event object is minimised by only storing the lower 32 bits of the FILETIME at event level, the upper 32 bits of the FILETIME are stored at the EventBucket level. However, if the maximum accuracy of the FILETIME structure is used, then the lower 32 bits of the FILETIME gives a range of 71.5 minutes. New EventBucket objects are required if this range expires, even if the current EventBucket object is not full. Since the quality flag for each event is nearly always the same, i.e. OPC_QUALITY_GOOD (0xC0), this is only stored on exception basis as a linked list of ExceptionQuality objects referenced from the EventBucket.

StringEventBucket 23(a)

The StringEventBucket is derived from the EventBucket class, and it requires special handling as strings are stored as ooVArrays of characters. The normal EventBucket implementation uses ooVArrays to store the data, but Objectivity does not permit ooVArray to be embedded within another ooVArray. Therefore the StringEventBucket implementation uses a fixed size array. The fixed array is implemented using a FixedArray template class which exposes identical methods to an ooVArray. This allows the templated code which deals with events in the database module, to treat all event data identically.

Attributes
  StringArray

XXXXEventBucket 23(a)

XXXXEventBucket classes are derived from the EventBucket class. A separate XXXXEventBucket class is defined for each of the Objectivity native data types as described in Table 1, above. The XXXXEvents are embedded into the XXXXEventBucket objects using ooVArrays.

Attributes
  Array

BaseEvent 23

The BaseEvent class is a non-persistent capable class and it is the base class for the XXXXEvent classes.

Attributes
  TimeLow
    The TimeLow attribute specifies lower DWORD of the event time.

XXXXEvent

The XXXXEvent classes are non-persistent capable classes, which represent the actual event data, they are derived from the BaseEvent class. Separate XXXXEventBucket classes are defined for each of the Objectivity native data types as described in Table 1, above.

Attributes
  Value

ExceptionQuality 23(c)

The ExceptionQuality class represents the quality flag for events. Quality is stored on an exception basis when the value is not OPC_QUALITY_GOOD (0x00C0). Each object contains a two byte quality flag and an index value.

Relationships
  Next
    Next is a reference to the next ExceptionQuality object in the linked list for an EventBucket.

Attributes
  ID
    The ID attribute is used to correlate ExceptionQuality objects with event objects, which are embedded in an array in the EventBucket.
  Value
    As defined in the OPC Data Access specification.

It will be appreciated that the invention provides for very fast data access because of the hierarchical compression in which the time string MSBs are encoded in the structure, abviating the need for indexes. Also, this structure saves approximately 6 bytes of storage per event. This has been achieved without loss of time precision. The database controller 4 has been found to achieve a writing performance of greater than 300,000 events per second and a reading performance of greater than 1 million events per second.

The invention is not limited to the embodiments described but may be varied in construction and detail.

The invention claimed is:

1. A plant information management system comprising:
   a data logger for interfacing with a plant process device to receive plant process measuring point data in real time, and at a non-uniform rate, said data comprising a plurality of events, each of said plurality of events comprising a time stamp having most significant bits, least significant bits, an event value and a data quality indicator;
   a plant information database; and
   a database controller for storing the events in said database, wherein:
   the database comprises a time-encoded structure which is hierarchical according to time periods of the most significant bits of the time stamps of the measuring point data, with successive hierarchical levels associated with shorter time periods;
   said time-encoded structure is defined according to a breakdown of bits of the time stamp;
   the database controller stores each event value in an event object in a value level linked with the time-encoded structure;
   the database controller stores the least significant bits of the time stamps in the event objects, the most significant bits being encoded in the time encoded structure;
   the database controller stores each event value as an attribute of an associated event object;
   the database controller accesses said value level to perform writing by using said time-encoded database structure as an index;
   the database controller performs time-based data queries by using a time value to drill down through the time-encoded structure to reach at least one selected event object in the value; and
   the database controller stores the data quality indicator only if it is exceptional.

2. The plant information management system as claimed in claim 1, wherein the database controller comprises means for storing the value data in linked list arrays.

3. The plant information management system as claimed in claim 1, wherein the database controller comprises means for storing item objects at an upper hierarchical level, each said item object being associated with a particular process device.

4. The plant information management system as claimed in claim 3, wherein the database controller comprises means for storing a year array object linked to each item object, said year array object comprising an array of references to day array objects.

5. The plant information management system as claimed in claim 4, wherein the database controller comprises means for storing an event bucket linked with each day array object, said event bucket comprising linked list arrays of data event objects.

6. The plant information management system as claimed in claim 1, wherein the data logger comprises means for determining quality of a data event, and for associating a quality indicator with the data event.

7. The plant information management system as claimed in claim 6, wherein the database controller comprises means for storing the quality indicator only if it is exceptional.

8. The plant information management system as claimed in claim 7, wherein the database controller comprises means for storing an event object as time and value strings in one array and exceptional quality indicators in a linked array.

9. The plant information management system as claimed in claim 1, wherein the data logger comprises means for caching received event data.

10. The plant information management system as claimed in claim 9, wherein the data logger comprises means for caching the event data intact in blocks which are linked list structures.

11. The plant information management system as claimed in claim 10, wherein the data logger comprises means for allocating a fresh linked list initially and for subsequently transferring flushed blocks to the fresh linked list to avoid the need to destroy flushed blocks and create fresh blocks after a data flush operation.

12. The plant information management system as claimed in claim 11, wherein the data logger comprises means for inserting a time stamp in each block of the fresh linked list and for periodically destroying blocks which have been unused for a time period exceeding a threshold.

13. A computer program product comprising computer-executable software code stored on a computer readable medium in a computer processor, said computer-executable software code comprising code for performing operations of a plant information management system as claimed in claim 1.

* * * * *